(12) United States Patent
Su et al.

(10) Patent No.: US 12,223,704 B2
(45) Date of Patent: Feb. 11, 2025

(54) LABEL-FREE CELL CLASSIFICATION AND SCREENING SYSTEM BASED ON HYBRID TRANSFER LEARNING

(71) Applicant: SHANDONG UNIVERSITY, Jinan (CN)

(72) Inventors: Xuantao Su, Jinan (CN); Zhuo Wang, Jinan (CN); Chao Liu, Jinan (CN); Junkun Jia, Jinan (CN); Kun Song, Jinan (CN); Hong Liu, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 419 days.

(21) Appl. No.: 17/804,073

(22) Filed: May 25, 2022

(65) Prior Publication Data

US 2022/0383629 A1 Dec. 1, 2022

(30) Foreign Application Priority Data

May 28, 2021 (CN) .......................... 202110592184.5

(51) Int. Cl.
*G06V 10/82* (2022.01)
*G06N 3/088* (2023.01)
(Continued)

(52) U.S. Cl.
CPC ............. *G06V 10/82* (2022.01); *G06N 3/088* (2013.01); *G06T 7/0012* (2013.01);
(Continued)

(58) Field of Classification Search
CPC .... G06V 10/82; G06V 10/273; G06V 10/764; G06V 20/69; G06V 20/693; G06V 20/695; G06V 20/698; G06V 10/70; G06V 20/64; G06V 10/58; G06V 10/762; G06V 10/60; G06V 10/774; G06V 10/778; G06V 30/1916; G06V 30/248; G06V 40/10; G06V 40/20; G06V 10/48; G06V 10/454; G06N 3/088; G06N 3/045; G06N 3/0464; G06N 3/09; G06N 3/096; G06N 20/10; G06N 3/08; G06N 20/00; G06N 3/04; G06N 3/086; G06N 3/126; G06N 20/20; G06N 3/0455; G06N 3/047; G06N 3/0475;
(Continued)

(56) References Cited

U.S. PATENT DOCUMENTS

2017/0052106 A1\* 2/2017 Hennig ................ G06V 20/698
2018/0286038 A1\* 10/2018 Jalali .................... G06V 20/695

\* cited by examiner

*Primary Examiner* — Nimesh Patel
(74) *Attorney, Agent, or Firm* — CBM PATENT CONSULTING, LLC

(57) ABSTRACT

A label-free cell classification and screening system based on hybrid transfer learning, including a data preprocessing module for acquiring 2D light scattering video data and for digital cell filtering, is made public here; the data preprocessing module includes the label-free high-content video flow cytometry, which has the optical excitation module, the sheath flow control module, and the data acquisition and processing module; the image archiving module is used to sort and set labels for cells; in the feature extraction module, the first convolutional neural network is used to obtain image data feature vectors; in the cell classification and screening module, a support vector machine model is used to obtain the cell screening results.

8 Claims, 8 Drawing Sheets

(51) Int. Cl.
*G06T 7/00* (2017.01)
*G06V 10/26* (2022.01)
*G06V 10/764* (2022.01)

(52) U.S. Cl.
CPC .......... *G06V 10/273* (2022.01); *G06V 10/764* (2022.01); *G06T 2207/20081* (2013.01); *G06T 2207/20084* (2013.01); *G06T 2207/30024* (2013.01)

(58) Field of Classification Search
CPC .......... G06N 3/067; G06N 3/094; G06N 7/01; G06N 7/02; G06N 3/084; G06N 5/01; G06N 5/04; G06N 3/044; G06N 5/025; G06T 7/0012; G06T 2207/20081; G06T 2207/20084; G06T 2207/30024; G06T 2207/10056; G06T 2207/10064; G06T 2207/10016; G06T 2207/20036; G06T 7/12; G06T 7/174; G06T 7/62; G06T 7/66; G06T 2207/10024; G06T 2207/10048; G06T 2207/10088; G06T 11/00; G06T 7/155; G06T 2207/30096; G06T 2207/30016; G06T 2207/30242; G06T 5/70; G06T 2207/10044; G06T 2207/10012; G06T 7/593; G06F 18/2411; G06F 18/24; G06F 18/00; G06F 18/217; G06F 18/24137; G06F 30/20; G06F 18/214; G06F 3/0425; G06F 18/23; G06F 18/24155; G06F 21/6218; G01N 15/1433; G01N 15/14; G01N 15/01; G01N 2015/1488; G01N 2800/7028; G01N 15/0205; G01N 15/0227; G01N 15/147; G01N 21/35; G01N 15/1436; G01N 2201/1296; G01N 2291/015; G01N 21/65; G01N 15/1429; G01N 21/3581; G01N 21/17; G01N 2015/144; G01N 33/5058; A61B 5/4848; A61B 5/0075; A61B 5/0071; A61B 5/0066
See application file for complete search history.

LABEL-FREE CELL CLASSIFICATION AND SCREENING SYSTEM BASED ON HYBRID TRANSFER LEARNING

CROSS-REFERENCE TO RELATED APPLICATIONS

This application claims priority to Chinese Patent Application Ser. No. CN202110592201.5 and CN202110592184.5 filed on 28 May 2021.

FIELD OF THE INVENTION

The present invention relates generally to techniques for biomedical detection and advanced medical equipment. More specifically, it refers to a label-free cell classification and screening system based on hybrid transfer learning.

BACKGROUND

The statement in this section only provides the background technology related to the present invention and does not necessarily constitute prior art.

Flow cytometry is one of the most common instruments combining accuracy and efficiency in the field of single-cell analysis. It not only can provide single-cell morphology or component information quickly and efficiently, but also can detect, identify and count a large number of cells in a short time. In general, traditional flow cytometry measures one-dimensional intensity signals, and it is difficult to obtain good cell analysis results in complex application conditions when cell imaging is required. To obtain single-cell images quickly, a novel flow single-cell detection instrument, imaging flow cytometry, is developed that combining the characteristic of high-throughput of flow cytometry and the microscopic imaging capability of fluorescence microscope.

The inventors here find that images with only a small number of pixels are obtained from brightfield channel of imaging flow cytometry working in a label-free single-cell imaging state. These images can only give low-pixel information on cell morphology and structure, which greatly limits the potential of its application. And, the data of the existing imaging flow cytometry is output in image format rather than video format. Static data cannot give the more details of sample state as well as the retrieval of the original data, which also limits its application to a certain extent. Moreover, it is usually unavoidable to adopt physical methods, such as filtering using membrane filters before loading samples, to reduce disturbance of impurities and cell clumps, while more steps mean more costs for operations et al. And, cell debris and non-cellular impurities in samples that cannot be filtered out can also reduce the accuracy of following analysis.

Cell classification and sample screening have a wide range of applications, especially in clinical disease screening. Traditional cell classification and sample screening techniques mainly rely on expert experience based on cell morphological characteristics and fluorescence characteristics. For example, the clinical sample detection of cervical cancer is mainly based on Pap smear test technology and liquid-based cytology test technology. Both these two methods require the judgment of experienced expert to stain cell smears. Compared with Pap smear test technology, liquid-based cytology test technology can obtain better and clearer cell pictures, which improving the sensitivity (True positive) and the specificity (True negative) of cervical cancer screening effectively. As an artificial intelligence technology that has been developed rapidly in recent years, deep learning has been widely used in the field of biomedicine. It cannot be ignored that deep learning reduces labor costs to some extent effectively and provides users with more reference, which has a positive impact on improving work efficiency and diagnosis accuracy.

However, the inventors find that existing deep learning methods are limited by smears data and lack a confidence criterion for determining individual status from single-cell discriminations. More importantly, high-performance deep learning methods usually require a great deal of training images with annotated ground truth as a prerequisite. In practice, the acquisitions of some samples are often a significant limitation, especially when samples are from patients, which means that it is often challenging to ensure the quantity and quality of the samples for training model. Transfer learning is proposed to solve the problem of small sample learning and has the characteristics of saving training time and improving accuracy. This method generally transfers parameters of the source domain model to the target domain model. Due to the differences between biomedical images and natural images, it is difficult to ensure the transferred effect of the model with simple parameter transfer in biomedical field. Two-dimensional (2D) light scattering technology is an effective optical label-free method to identify differences of cellular structures and cell morphology. In general, the existing deep learning analysis models for 2D light scattering technology require large training set and only target specific cells. It is beneficial to further expand the application field of label-free single-cell analysis by combining transfer learning and 2D light scattering.

SUMMARY OF THE INVENTION

In order to solve the deficiencies of the prior art, the present invention provides a label-free cell classification and screening system based on hybrid transfer learning, which realizes the automatic processing of data to reduce the cost of human resources. Through the transfer of natural image training parameters and the transfer of features of cell-line cells, this method reduces the dependence of clinical samples. And, a confidence criterion is designed to determine individual status through statistical class discrimination of single cells.

This invention provides a label-free high-content video flow cytometry platform and method, which adopts 2D light scattering technology to show sensitivity of the cellular structure and cell morphology information. In order to simplify the data measurement and processing, sheath flow technology and pioneered digital cell filtering are employed to improve workflow automation. The adoption of label-free method can be able to reduce the workload of sample preparation and the damage to samples. This enables the method to have high timeliness and low sample requirements, greatly expanding the field of application. High-speed and high-resolution image sensor is integrated into the system to ensure spatial and temporal resolution of high-content video data measurement for traceable localization of patterns. It is possible to minimize the redundancy of output data by adding video trigger mechanism.

To achieve the above purpose, technical solutions of the present invention are following:

The first aspect, the present invention provides a label-free cell classification and screening system based on hybrid transfer learning.

A label-free cell classification and screening system based on hybrid transfer learning, including:

A data preprocessing circuit, which is configured to: acquire 2D light scattering video data, preprocess the acquired 2D light scattering video data, and obtain images after removing disturbance.

An image archiving circuit, which is configured to: sort and label preprocessed the images to obtain sorted images according to a ground truth.

A feature extraction circuit, which is configured to: get feature vector of the sorted images using a first convolutional neural network with pre-trained parameters.

A cell classification and screening circuit, which is configured to: input the obtained feature vector of the sorted images into a trained support vector machine model to get cell classification results.

Wherein the support vector machine model is trained by feature vectors of clinical samples and transferred feature vectors of cell-lines.

As a possible implementation, the data preprocessing circuit comprises a label-free high-content video flow cytometry platform.

The label-free high-content video flow cytometry includes: an optical excitation circuit, a sheath flow control circuit and a data acquisition and processing circuit.

The optical excitation circuit excites samples flowing in the flow chamber of the sheath flow control circuit to generate the scattering information. These patterns are measured by the data acquisition circuit and transmitted to the data processing circuit for following processing and analysis.

Among them, the sheath flow control circuit can restrict the spatial flowing area of the samples for forming a flowing single-cell sequence. And the laser beam of the optical excitation circuit is shaped by the objective and coupled into the flow chamber, so that the sample sequence and the excitation beam only overlap in the preset area.

As a possible implementation, the optical excitation circuit includes: a laser source, a neutral density lens (light intensity control), collimating diaphragms, mirrors (direction control) and an excitation objective (shaping laser beam), which are set along the optical path in sequence.

As a possible implementation, the sheath flow control circuit is used for driving cells to form the single-cell sequence, including a flow chamber, a syringe pump for sample fluid and a syringe pump for sheath fluid. The sample fluid flows into flow chamber from the middle inlet, while the sheath fluid flows from the surrounding inlet. Usually, the velocity of the sheath fluid is greater than the sample fluid.

Before the sheath fluid flows through the preset area, it passes through a buffer chamber to stabilize the fluid and pre-disperse its flowing direction to ensure that the sheath fluid compresses the sample fluid in two orthogonal directions at the same time.

As a further limitation, the sheath flow control circuit includes a waste liquid pool for collecting the sample fluid and the sheath fluid after flowing through the preset area.

As a possible implementation, the data acquisition circuit includes a measurement optical path and a data path. The measurement optical path includes a detection objective, a high-speed CMOS detector and a trigger at least. The detection objective focuses on the overlapping portion of the sample sequence and the excitation beam. And the trigger is positioned ahead of the detector to control the storage time of the detector.

The data path transmits and stores the high-quality video data acquired by the high-speed CMOS detector to the data processing circuit.

As a possible implementation, the data processing circuit performs automatic preprocessing on the acquired data followed by a CNN feature extractor based on transfer learning algorithm to get feature vectors. The SVM model processes the feature vectors to obtain the classification result. Furtherly:

The preprocessing step includes the digital cell filtering technology, specifically include:

Convert the video data into image data. Locate the position of patterns and automatically capture and save patterns. Finally, filter the saved images.

Each image is processed by the morphological algorithm and the granularity analysis algorithm to obtain the image morphological granularity feature value. Determine whether the feature value is within the threshold range. If so, keeping the image, otherwise removing the image.

A trained machine learning filter is applied to filter retained images.

As a further limitation, the morphological granularity features of the image are subjected to threshold discrimination. If it is within the range of the preset ratio with the mean as the center, the image is retained, otherwise it is removed as an impurity.

The second aspect, the present invention provides a computer-readable storage medium on which programs are stored. And when the program is executed by a processor, the following steps are implemented:

The 2D light scattering video data is preprocessed to obtain the image data without impurities.

The filtered image data is archived and labeled according to the ground truth.

Based on the first convolutional neural network with pre-trained parameters and the obtained image data and labels, the feature vector of the image data is obtained.

The obtained feature vector is input into the preset support vector machine model to obtain the cell classification screening result.

Among, the support vector machine model is trained by feature vectors of clinical samples and transferred feature vectors of cell-lines.

The third aspect, the present invention provides an electronic device, including a memory, a processor and programs that are stored in memory and run on a processor. The program steps executed by the processor are following:

The 2D light scattering video data is preprocessed to obtain the image data without impurities.

The filtered image data is archived and labeled according to the ground truth.

Based on the first convolutional neural network with pre-trained parameters and the obtained image data and labels, the feature vector of the image data is obtained.

The obtained feature vector is input into the preset support vector machine model to obtain the cell classification screening result.

Among, the support vector machine model is trained by feature vectors of clinical samples and transferred feature vectors of cell-lines.

The fourth aspect, the present invention provides a label-free high-content video flow cytometry detection method based on transfer learning.

A label-free high-content video flow cytometry detection method uses the label-free high-content video flow cytometry described in the first aspect of the present invention. The following steps are included:

Process cultured cells to form the single-cell state. Prepare a certain concentration of single-cell suspension to be measured with phosphate buffer saline (PBS) solution. Make use of PBS solution as sheath fluid. Place the sample fluid and the sheath fluid in syringes.

Set she parameters of syringe pumps and starting the syringe pumps to form the sheath flow. The sample fluid is 30 μL/h, and the sheath fluid is 800 μL/h.

Start the light source and CMOS detector to observe the formation of the sheath flow and the imaging effect. Adjust the stage to make the system work in defocusing mode.

Activate the trigger to capture and record video data of 2D light scattering patterns as samples flow through the preset area.

When the data acquisition is over, replacing the sample fluid and the sheath fluid. Flush the system with alcohol solution followed by ultrapure water.

Process video data with preset algorithm to extract desired patterns and analyzing the processed data with classification algorithm automatically.

The fifth aspect, the present invention provides a method for calibrating the label-free high-content video flow cytometry that using the label-free high-content video flow cytometry described in the first aspect. It mainly includes sheath flow calibration and the main steps are following:

Place and adjusting each component in the preset position so that each circuit can work normally that enables coupling of the excitation light beam, sheath flow and measurement light path in preset area.

Prepare Rhodamine 6G solution and putting it in the sample fluid syringe. Use ultrapure water as the sheath fluid and putting it in the sheath fluid syringe. Set the parameters of the syringe pumps and starting the syringe pump to form the sheath flow normally.

Adjust the stage to make the sample fluid flow in the center of the field of view. And focus the system to observe the sheath flow effect.

Start the light source to observe and further adjust the position of each circuit, so that the sample fluid can be accurately excited and focused.

Turn on the CMOS detector and the trigger to capture and record data.

When the data acquisition is over, replacing the sample fluid and the sheath fluid. Flush the system with alcohol solution followed by ultrapure water.

Process the acquired data. Calculate and verify the effect of the sheath flow.

The sixth aspect, the present invention provides a method for calibrating the label-free high-content video flow cytometry that using the label-free high-content video flow cytometry described in the first aspect. It mainly includes the calibration of standard microspheres and the main steps are following:

Prepare the microspheres solution and put it in the sample fluid syringe. Use ultrapure water as the sheath fluid and put it in the sheath fluid syringe.

Set the parameters of the syringe pumps and start the syringe pump to form the sheath flow normally.

Start the light source and CMOS detector to observe the formation of the sheath flow and the imaging effect. Adjust the stage to make the system work in defocusing mode.

Activate the trigger to capture and record video data of 2D light scattering patterns as samples flow through the preset area.

When the data acquisition is over, replacing the sample fluid and the sheath fluid. Flush the system with alcohol solution followed by ultrapure water.

Count the number of microspheres. Compare obtained results with the simulated pattern using Mie theory under experimental conditions.

Compared with the prior art, the beneficial effects of the present invention are:

1. The system, computer-readable storage medium or electronic device of the present invention adopts hybrid transfer learning to realize label-free cell classification and screening and reduce a lot of human cost with fully automatic data processing method.

2. The system, computer-readable storage medium or electronic device of the present invention employs the label-free 2D light scattering technology to eliminate traditional staining and fluorescence steps compared to traditional cytological examination methods, which reduces operational complexity, the cost of biological reagents and the damage to samples. It is suitable for the label-free high-content video data acquisition.

3. The system, computer-readable storage medium or electronic device of the present invention adopts the digital cell filtering as preprocessing system to reduce the need for physical filtration through filter elements and the cost of the system, which improves the automation of system.

4. In traditional cell classification and screening, such as cervical cancer screening, it is necessary to identify the obtained images by experienced experts, which has a strong subjectivity. The system, computer-readable storage medium or electronic device of the present invention uses the algorithm rather than manual observation to make the result more stable, objective and automated, thereby eliminating possible subjectivity errors.

5. The system, computer-readable storage medium or electronic device of the present invention adopts a two-step hybrid transfer learning method to process samples, which uses accessible cell-line samples in the analysis of clinical samples to reduce the usage and dependence on clinical samples effectively. Compared with the transfer of pre-trained parameters, this method improves the accuracy of classification and screening and provides a solution for the analysis of clinical samples, small samples and rare samples.

6. The system, computer-readable storage medium or electronic device of the present invention provides a new reference index for sample screening, which characterizes the state of clinical individuals through precise analysis of single-cell patterns. Judging the state of the sample according to the threshold set by the cell classification, providing users with quantitative indicators for the classification and screening of complex samples.

7. The system, computer-readable storage medium or electronic device of the present invention adopts convolutional neural network to extract features of unlabeled images, which is better to analyze unlabeled information that cannot be directly extracted by human eyes with powerful machine learning. It is faster and more comprehensive method compared with manual feature extraction.

8. The system, computer-readable storage medium or electronic device of the present invention provides a general processing method, which is suitable for cytology-based screening with migration universality and generalizability.
9. The flow cytometry platform and method of the present invention, namely the label-free high-content video flow cytometry, is based on 2D light scattering technology, which has the sensitivity of cellular structural and morphological information to provide complex label-free single-cell information.
10. The flow cytometry platform and method of the present invention adopts automated flow control scheme to ensure the orderly sequence of cells passing through the preset area. This method is simple stable and accurate that can reduce the labor cost of manual operations.
11. The flow cytometry platform and method of the present invention acquires video big data with high-speed CMOS detector at high temporal resolution. It is possible to record comprehensive video of samples flowing through the preset area that provides high-quality raw information and data traceability.
12. The flow cytometry platform and method of the present invention acquire high-content information that can effectively use the full resolution of the CMOS detector to improve the spatial details of single-cell information acquisition.
13. The flow cytometry platform and method of the present invention adopts digital cell filter technology and trigger circuit to reduce the measurement of redundant data, which eases the pressure of data storage.
14. The flow cytometry platform and method of the present invention uses a scalable analysis algorithm. The overall effect of the system is not limited by the level of current research.
15. The flow cytometry platform and method of the present invention is portable and extensible that can be quickly applied to researches in different fields. It is not limited to a certain type of cells and has a certain universality.

Advantages of additional aspects of the present invention will be given in part in the following description. Parts will become apparent from the following description, or learned by practice of the invention.

BRIEF DESCRIPTION OF THE DRAWINGS

The accompanying drawings, which form a part of the present invention, are used to provide further understanding of the present invention, and the exemplary embodiments of the present invention and their descriptions are used to explain the present invention, and do not constitute an improper limitation of the present invention.

Figure 1:
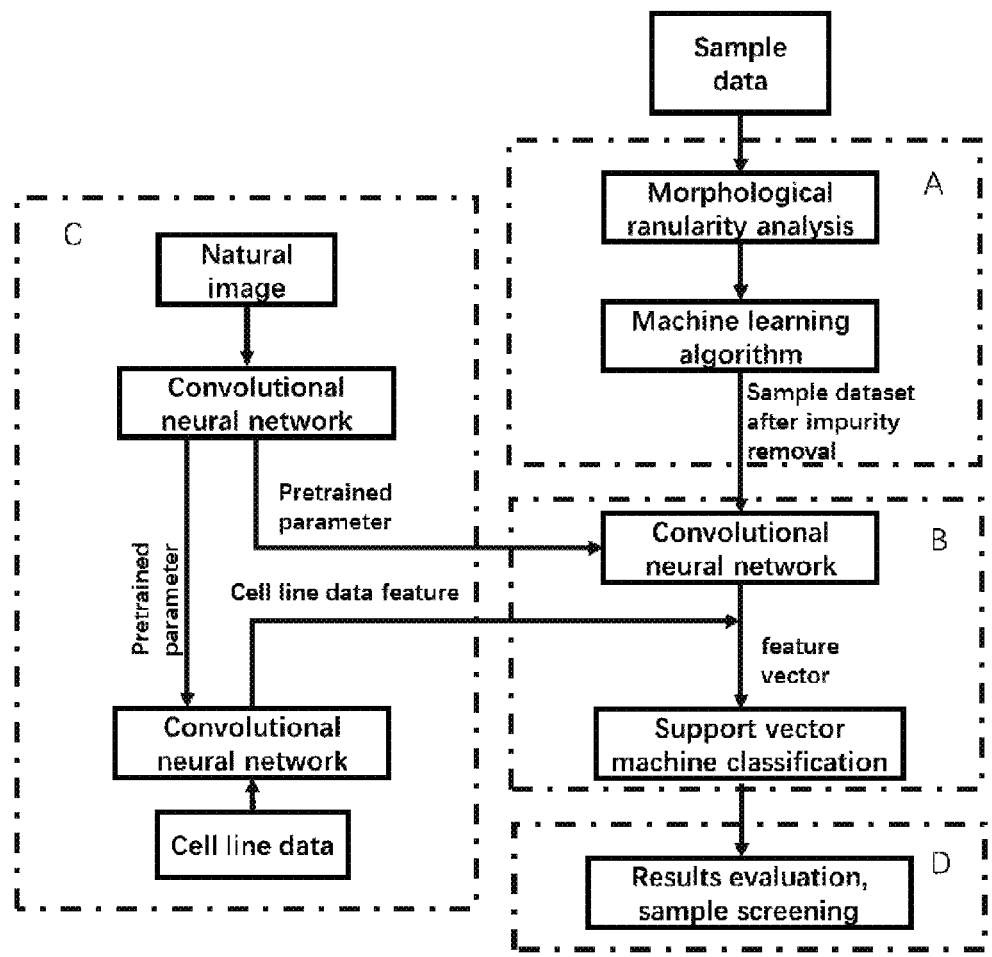
FIG. 1 is the workflow schematic diagram of the label-free cell classification and screening system based on transfer learning provided in the present invention embodiment 1.

Among FIG. 1, 1. Laser. 2. Neutral density lens. 3. Collimating diaphragms. 4. Mirror. 5. Excitation objective. 6. Sheath flow chamber. 7. Detection objective. 8. High-speed CMOS detector. 9. Data processing and analysis system. 10. Trigger. 11. The sample fluid. 12. The sheath fluid.

DETAILED DESCRIPTION OF INVENTION

The present invention will now be described more fully hereinafter with reference to the accompanying drawings and embodiments.

It should be noted that the following details are illustrative and are intended to provide further illustration of the invention. Unless otherwise defined, all terms (including technical and scientific terms) used herein have the same meaning as commonly understood by one of ordinary skill in the art to which this invention belongs.

It should be noted that the terminology used herein is for the purpose of describing particular embodiments only and is not intended to be limiting of the invention. As used herein, the singular forms "a", "an" and "the" are intended to include the plural forms as well, unless the context clearly indicates otherwise. It should also be understood that when the terms include and/or, it indicates the presence of features, steps, operations, devices, components and/or combinations thereof.

The embodiments in the present disclosure and features in the embodiments may be combined with each other without conflict.

Embodiment 1

As shown in FIG. 1, Embodiment 1 provide a label-free cell classification and screening system based on hybrid transfer learning, including:
  The data preprocessing circuit, which is configured to: acquire 2D light scattering video data, preprocess the acquired video data, and obtain image data after removing disturbance.
  The image archiving circuit, which is configured to: sort and label preprocessed images according to the ground truth.
  The feature extraction circuit, which is configured to: get feature vector of the image data using the first convolutional neural network with pre-trained parameters.
  The cell classification and screening circuit, which is configured to: input the obtained feature vector into the trained support vector machine model to get cell classification results.

Among them, the support vector machine model is trained by feature vectors of clinical samples and transferred feature vectors of cell-lines.

Specifically, the system include:

A: Digital cell filtering pre-processing part, B: CNN-SVM classification part, C: Hybrid transfer learning part, D: Evaluation and screening part.

In the digital cell filtering preprocessing part, the original 2D light scattering videos are filtered frame by frame and classified and stored according to the ground truth. After digital filtering, the 2D light scattering pattern dataset is entered into the convolutional neural network (CNN) for deep feature extraction. The extracted feature parameters are put into support vector machine (SVM) classifier to obtain the training model. The hybrid transfer learning part includes instance-based transfer and feature-based transfer, which reduces the use of real samples such as clinical samples and improves learning efficiency and accuracy. Finally, the training model is used to test the testing samples, and the results are judged by the evaluation and screening part to give the final classification results.

Figure 2:
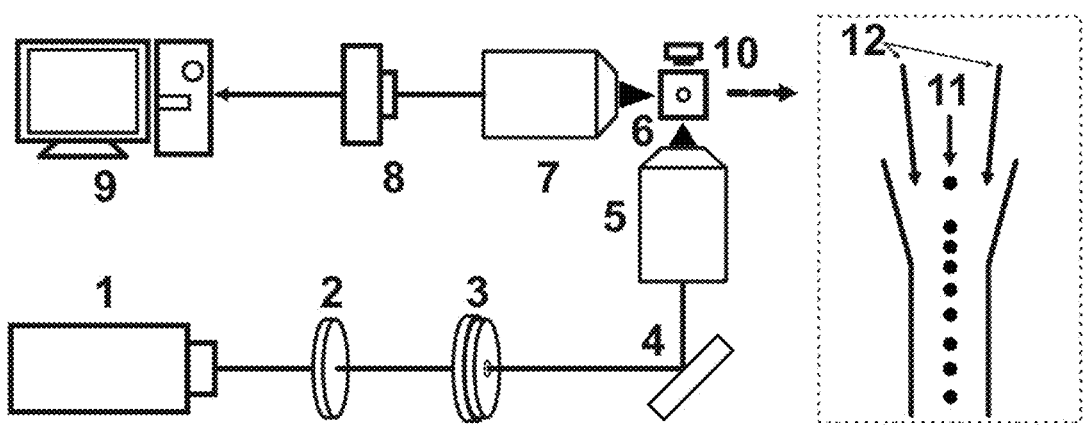
FIG. 2 is the schematic diagram of the label-free high-content video flow cytometry based on transfer learning provided in the present invention embodiment 1.

Specific, as shown in FIG. 2, the label-free high-content video flow cytometry includes: the optical excitation circuit, the sheath flow control circuit, the data acquisition and processing circuit.

Optical excitation circuit includes: laser 1 (532 nm), neutral-density filter 2 (50%, 32%, 10%, 1% etc.), laser aperture 3, metal-coated plano mirror 4, excitation objective lens (4×) 5. Laser 1 is used as illumination source. The laser beam energy is adjusted by a neutral density filter 2. The illumination objective 5 focuses the laser beam to the field of view. The laser aperture 3 acts as a light path switch.

In this embodiment, the purpose of the optical excitation circuit is to shaping the laser light, so that it forms a approximate cylinder excitation area in the observation area. The sheath flow control circuit is used to limit the spatial flow of the sample liquid. Combined with laser shaping, the sample and excitation beams only overlap in a limited small area, thus greatly improving the collection efficiency.

The sheath flow control circuit includes: Sheath flow chamber 6, two syringe pumps is used to drive the sample liquid 11 and the sheath liquid 12, waste water pool. Syringe pump is the power source of liquid flow, which is include sample syringe pump and sheath fluid syringe pump. The syringe pump presses the liquid into the sheath flow chamber. The sample liquid flows into the middle channel of the sheath flow chamber, and the sheath liquid flows into the surrounding channel. The velocity of the sheath fluid should be much higher than that of the sample fluid so that the sheath flow can be observed at a long enough distance. The waste water pool is used to collect spent samples and sheath liquid.

The data acquisition and processing circuit include: detection objective lens 7 (40×), high speed CMOS 8, data processing and analysis system 9, trigger 10 and a precise displacement device. This circuit needs to be able to focus and defocus accurately to meet the needs of data acquisition. The focus of the trigger is slightly earlier than the high-speed CMOS so that the CMOS can be controlled in time as the sample passes through. The high-content video data is recorded by the high speed CMOS for subsequent processing steps. During the data processing stage, the system can automatically locate and intercept the patterns in the video data, and realize the recognition and classification of cells through machine learning and deep learning.

In this embodiment, data acquisition and processing circuit can collect high intension pattern video as quickly as possible to form video big data. The video data can be used for subsequent classification analysis and trace the origin of pattern.

The specific process is as follows: The semiconductor pump laser generates a 532 nm laser beam with a diameter of 1.052 mm. The laser beam energy and ray path are adjusted by a neutral density filter and a metal-coated plano mirror, respectively. After illumination objective (4×) shaping, the laser coupling into flow chamber.

At the same time, The syringe pump drives the sample liquid and sheath liquid into the flow chamber, and the sample liquid is restricted to flow in the region close to the excitation beam. The detection objective is also focuses on the place where the sample liquid and the excitation beam overlap, so the acquisition efficiency is also greatly improved. The collected data is transferred to a computer for storage and analysis.

The digital cell filtering preprocessing part mainly uses morphological granularity analysis method and machine learning algorithm to filter the 2D light scattering video data frame by frame. The morphological granularity analysis method mainly quickly removes simple contaminations such as cell fragments and air bubbles in the video. The machine learning algorithm mainly removes more complex contaminations. The morphological granularity analysis method can extract the intensity and gradient information of speckle, and the threshold is limited to the range of 60% of the features of each dimension (centered on the mean). The machine learning filter model is trained by a prior pattern and impurity dataset, and the training network model is CNN.

CNN-SVM classification part include CNN feature extractor and SVM classifier. CNN feature extractor is constitute of a neural network, which input 2D light scattering pattern training data and output the training data feature vector. SVM classifier automatically optimizes the classification function by finding the optimal parameters and realizes the automatic classification of samples based on the input feature vector. The CNN network used in the present invention is the Inception v3 network. The front of the network consists of an alternating structure of 5 convolutional layers and 2 pooling layers, which are then formed by combining three sub-network circuits, and finally the average pooling layer integrates the output results.

Hybrid transfer learning part mainly includes two aspects: instance-based transfer mainly uses the pre-trained models for cell pattern feature extraction to avoid long-time new model learning. Feature-based transfer mainly augments the feature library of clinical data by adding a fixed ratio of cell line 2D light scattering pattern features. Feature transfer refers to the transfer of pure cell line features into real samples such as clinical samples. Instance-based transfer circuit is obtained by training on natural images, and the pre-trained parameters are reserved and transferred.

In this embodiment, the cervical cancer cell line include Caski cell line, HeLa cell line and C33-A cell line are used for feature-based transfer. The transfer target is clinical cervical cancer samples to make cultured samples to provide a certain weight in the clinical model training through feature fitting. The fitting coefficient is defined as the ratio of mean features of the target domain and source domain in the feature space.

The formula is defined as $$\rho = \sum_{n=1}^{N}\left(\frac{X_T}{X_S}\right)$$

$X_T$ represents the feature space of the target domain, $X_S$ represents the feature space of the source domain.

In evaluation and screening part, the cell classification probability value obtained in the classification section is used for sample classification A cell classification threshold is defined to judge the status of the sample to provide a judgment indicator for the doctor. In case 3, this embodiment outputs three indicators: cervical cancer, normal and suspicious, wherein the suspicious sample also provides a ratio value as a suspicious risk value for cancer and outputs together.

More specifically, the system works includes the following steps:
- Step 1: The sample video data are obtained and stored by 2D light scattering video flow cytometry.
- Step 2: The video data is put into the digital cell filtering preprocessing part. In this part, the video data is divided into image data frame by frame, and then the obtained image data is filtered. Each image data is processed by the morphological granularity analysis algorithm to obtain the image morphological granularity characteristic value. Images whose eigenvalues meet the standard are retained, otherwise the images are rejected. Then, a trained machine learning model is used to further filter the retained images to remove more complex impurity patterns, and the filtered image datasets are classified and stored according to the ground truth and marked with labels.
- Step 3: The 2D light scattering pattern data and labels are put into the convolutional neural network with pre-trained parameters to obtain final feature vector.
- Step 4: A certain proportion of cultured cell line feature vectors are selected to mix with actual sample feature vectors to generate cell line-based transfer data feature vectors.
- Step 5: The feature vectors and labels are put into SVM classifier to obtain final classification model.
- Step 6: The test sample data are filtered and stored by digital cells and then input into the feature extraction model to extract features. After that, the feature vector is sent into the classification model for classification to obtain the classification probability value.
- Step 7: According to the classification probability value, the sample status is judged for sample screening, and the classification probability and judgment result are output and given to the user for reference.

Case 1:

The transfer learning-based cell classification and sample screening method is used to extract frames of interest from 2D light scattering videos of complex samples. In actual sample screening, complex samples often contain air bubbles, cell fragments, and other unknown impurities. In order to improve the classification accuracy and extract the 2D light scattering pattern of all cells as much as possible, this present invention performs automatic filtering and screening on the original video data. A clean 2D light scattering pattern dataset of samples is obtained through a filtering procedure to facilitate subsequent further operations.

Figure 3:
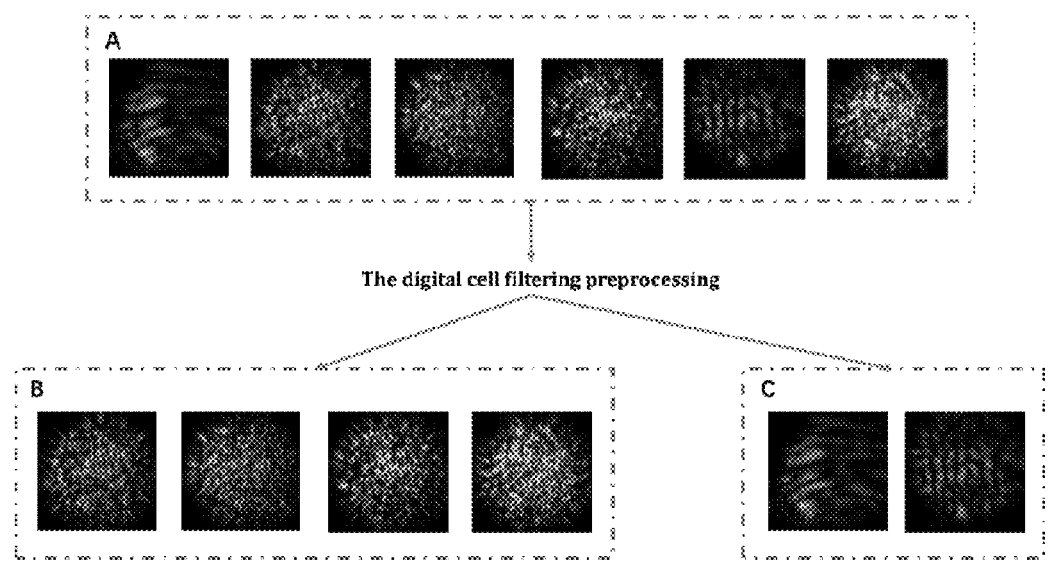
FIG. 3 is the effect of the digital cell filtering provided in the present invention embodiment 1.

Specific Operation Steps:
- (1) About 13.5 G/min 2D light scattering video of clinical sample cells is extracted into frame images in JPG format.
- (2) Each frame images are processed by the morphological granularity algorithm, and the threshold parameter of the algorithm is 0.6.
- (3) The morphological granularity features of the image are subjected to threshold discrimination. If it is within the range of the preset ratio, the image is retained, otherwise it is removed as an impurity.
- (4) The images retained in step (3) are input into the machine learning algorithm for judgment, and the algorithm automatically recognizes the pattern and removes the non-cellular impurities pattern.
- (5) The images retained in step (4) are saved and labeled. The experimental results are shown in FIG. 3, A is the image frame before impurity removal, B is the retained image of interest, and C is the removed impurity image. This case proves that the present invention can effectively extract the image of interest in the video, and effectively remove the impurity image.

Case 2:

In order to verify the sensitivity and accuracy of the invention for the identification of 2D light scattering patterns of cells, cervical cancer cell line cells are used to test. In this case, three common cervical cancer cell lines (Caski, Hela and C33-A) are selected as test samples to validate the system.

Figure 4:
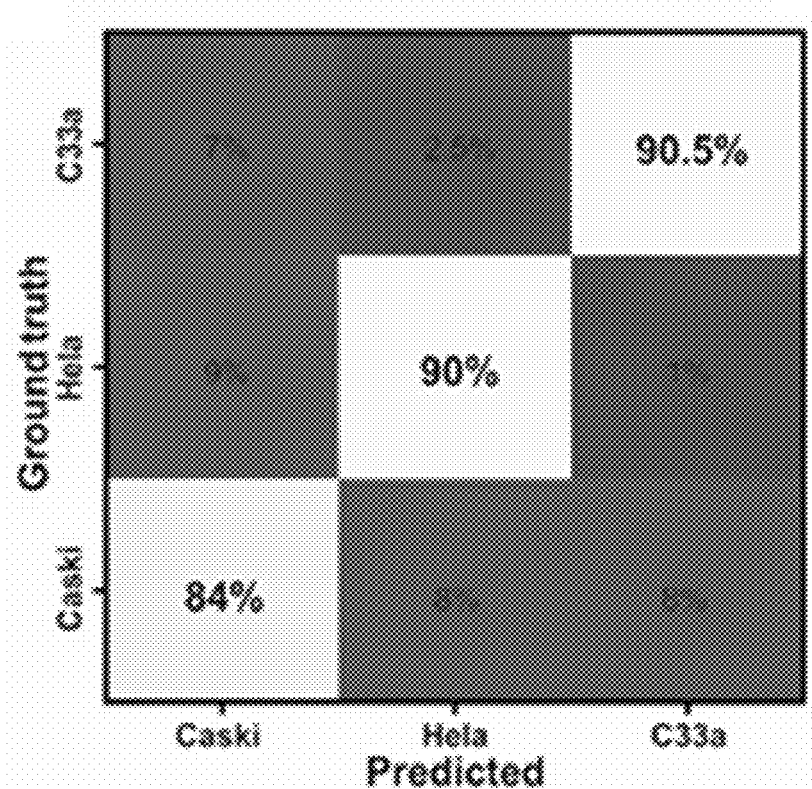
FIG. 4 is the classification accuracy of three kinds of cervical cancer cell-lines provided in the present invention case 1 of embodiment 1.
Figure 5:
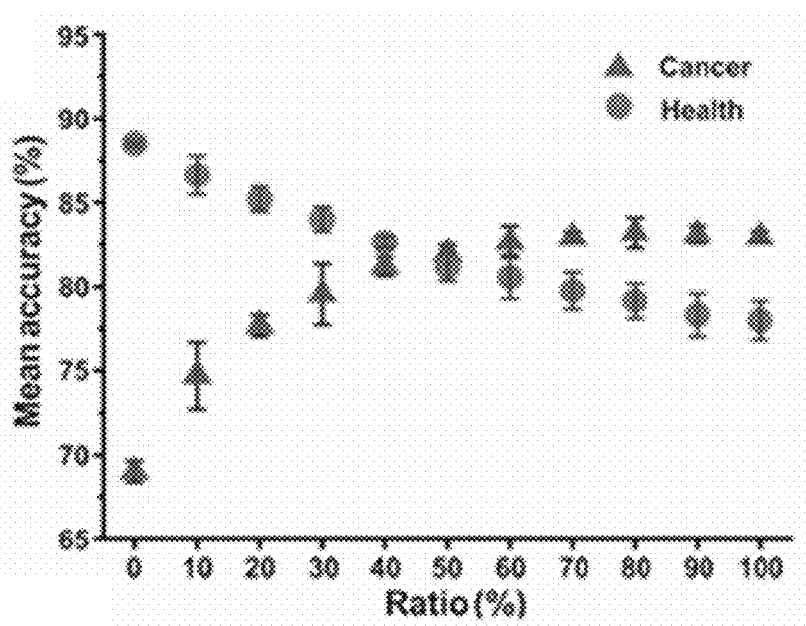
FIG. 5 is the result of the feature transfer analysis provided in the present invention case 3 of embodiment 1.

Specific Operation Steps:
- (1) The 2D scattering pattern video data of three cervical cancer cell lines are collected and split frame by frame. The images are input into the digital cell filter preprocessing part to filter the cell images. According to the different cell lines of origin, the image labels are marked as: Caski cells, Hela cells and C33-A cells.
- (2) The training and testing datasets are randomly selected from filtered 2D light scattering pattern dataset. The training dataset size is greater than 11000 and the testing dataset is 1200. This two datasets do not overlap. The ratio of the training data is 1:1:3 (Caski:HeLa:C33-A) and the ratio of testing data is 1:1:1 (Caski:Hela:C33-A).
- (3) The training and testing datasets are put into deep learning (Inception v3) feature extractor with pre-trained parameters for feature extraction. The output before the full connection layer is selected as the extracted features (2048 dimensions), and input into the SVM classifier to obtain the final classification model.
- (4) The feature extraction model and classification model obtained in step (3) are used to obtain the testing datasets (400 Caski cells, 400 Hela cells and 400 C33-A cells) classification result.
- (5) Compare the automatic classification labels with the ground truth labels to calculate the accuracy of each type of cells. The experimental results are shown in FIG. 4, the accuracy rates of Caski cells, Hela cells, and C33-A cells are 84%, 90% and 90.5%. This case proves that the feasibility and accuracy of this embodiment for cancer cell classification.

Case 3:

In this case, clinical cervical cancer samples and normal samples are automatically classified and screened by the transfer learning-based cervical cancer screening method. Clinical TCT samples from 25 volunteers (9 cases of clinical cervical cancer and 16 cases of normal) are used in this case. Video data is collected for each sample, and more than 2000 cell patterns are obtained per sample. The video is processed by the method of this invention. Leave-one-out cross-validation is used for testing, specifically, 24 samples are used as training samples and one is used as test sample until all 25 samples are tested.

Figure 6:
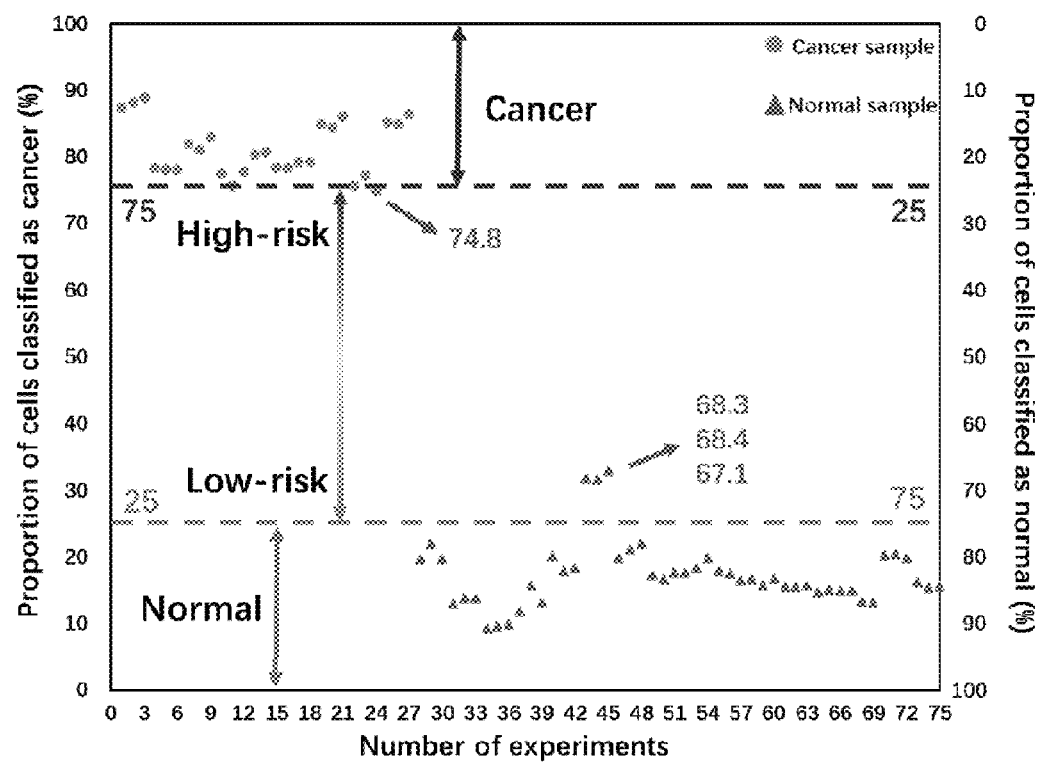
FIG. 6 is the result of 75 clinical experiments and screening standard provided in the present invention case 3 of embodiment 1.

Specific Operation Steps:
(1) The 2D scattering pattern video data of 25 clinical samples are collected and split frame by frame. The images are input into the digital cell filter preprocessing part to filter the cell images. According to the source of clinical samples, the image labels are marked as: from cervical cancer patients and from normal people.
(2) The training and testing datasets are put into deep learning (Inception v3) feature extractor with pre-trained parameters for feature extraction. The output before the full connection layer is selected as the extracted features (2048 dimensions) to obtain the feature vector of each cell.
(3) Next is feature-based transfer part. It is well known that clinical samples are scarce and cancer clinical samples also contain normal cell interference. The present invention mixes the features extracted from cervical cancer cell lines into the feature of clinical cervical cancer samples to increase the sample size and reduce interference. In this case, The transfer ratio of clinical cervical cancer sample features to cervical cancer cell line features is 4:6, and the clinical normal sample features were not transferred. The effect of feature transfer is shown in FIG. 4. The average accuracy of cell classification changed with the proportion of cell line sample characteristics to total characteristics. In order to balance the two cases, the intersection position of the two curves is selected as the best mixing ratio (40% of clinical cervical cancer sample features, and 60% of cervical cancer cell line features).
(4) The transferred features are input into the support vector machine (SVM) classifier for classification training to obtain the final classification model.
(5) The leave-one-out cross-validation method is adopted, and steps (2), (3), and (4) are repeated 25 times, and a total of 25 final feature extraction models and classification models are obtained.
(6) The data of one clinical sample not used for training is used as a test sample. Then the classification label of each picture was obtained. finally, the results of all 25 clinical samples were obtained.
(7) To test the stability of the system, repeat steps (2)-(6) for 3 times with the same sample. A total of 75 test results are obtained (25 samples*3 tests).
(8) The results obtained in step (7) were used for evaluation. FIG. 6 shows the results of 75 experiments in this case. By analyzing the results, 75% was determined as the judgment threshold. This means that if more than 75% of the cells in a sample are classified as 'from cancerous, the sample is classified as cervical cancer patient. On the contrary, the sample is considered to be normal if the ratio of 'from normal' is more than 75%. When the majority cells in a sample fail to reach the threshold ratio, the sample is considered to be suspicious and the risk level increases as the number of 'from cancerous' cells (low-risk to high-risk). For the nine clinical cervical cancer samples that are evaluated by 27 experiments, only one experiment is classified as 'suspicious', however it is still with a high-risk (74.8231%). For the forty-eight evaluations of sixteen healthy samples, three experimental results are classified as 'suspicious' with a very low risk (68.2823%, 68.3535%, 67.1418%). This example proves the feasibility and accuracy of the present invention for practical screening of cervical cancer.

Embodiment 2

In order to test the working effect and stability of each circuit of the label free high content video flow cytometry in Embodiment 1, Rhodamine 6G solution is used for experimental verification and calibration in this embodiment. Rhodamine (6G) solution is used as sample liquid and pure water is used as sheath liquid. The device described in Embodiment 1 is used to obtain video data under white light illumination, and one frame is intercepted for analysis. The intensity of the pixels in the middle 10 rows of the frame is scanned, and the average intensity curve is made to obtain the actual range of the sample flow.

Specific Operation Steps:
(1) According to the solution described in Embodiment 1, each component is placed in a preset position so that each circuit can work normally.
(2) 4 mg rhodamine 6G solute is dissolved in 4 mL ultrapure water and place it in the sample syringe. Ultrapure water is extract as sheath liquid and place it in the sheath syringe. Set the parameters of the syringe pump and start the syringe pump. The flow rate of the sample and sheath is 960 uL/h and 9600 uL/h, respectively.
(3) White light is used for auxiliary illumination, and control the stage of the acquisition optical path so that the sample is in the center of the field of view.
(4) Open the laser source, calibrate the position of each component in the optical path again. The excitation beam, sheath flow and collection optical path can be precisely coupled.
(5) Turn off the laser source, open the high speed CMOS and trigger, collect high quality video data.
(6) After collection, the sample liquid and sheath liquid are replaced as 75% alcohol solution and ultrapure water to flush the system.
(7) The intensity of pixels in the middle row of a frame is scanned to calculate and verify the effect of sheath flow.

Figure 7:
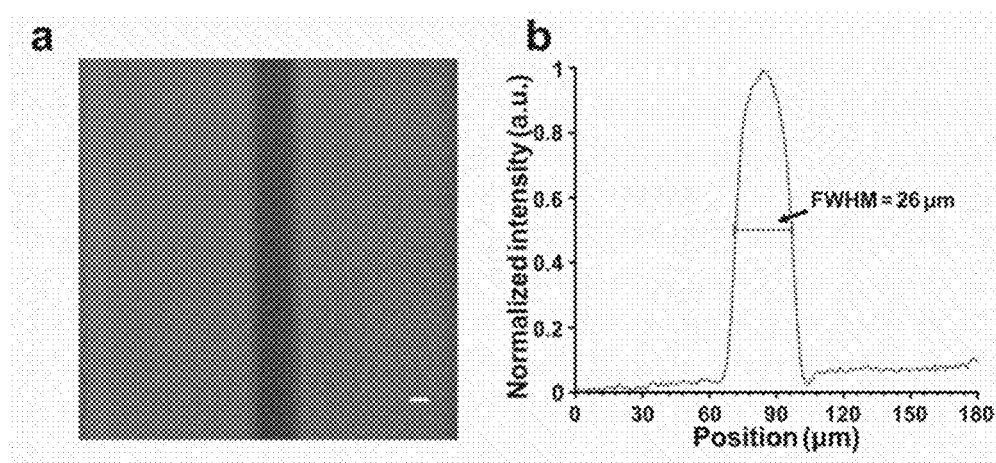
FIG. 7 is the result of sheath flow effect and intensity scan with Rhodamine 6G under white light illumination provided in the present invention embodiment 2.

In this embodiment, the result are shown in FIG. 7 (*a*) and FIG. 7 (*b*). The average intensity of FWHM of the middle 10 lines of the image is 26 µm, and the maximum width is about 40 µm. This example proves the device has better sheath flow effect and stability.

Embodiment 3

Figure 8:
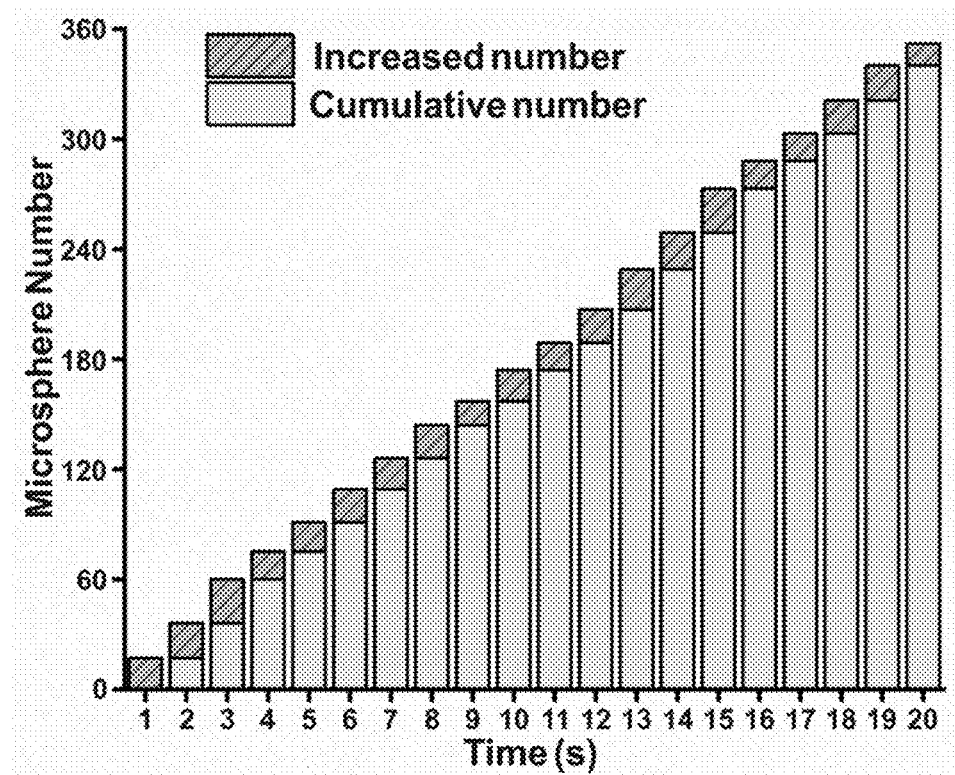
FIG. 8 is the result of the statistics of the number of microspheres provided in the present invention embodiment 3.
Figure 9:
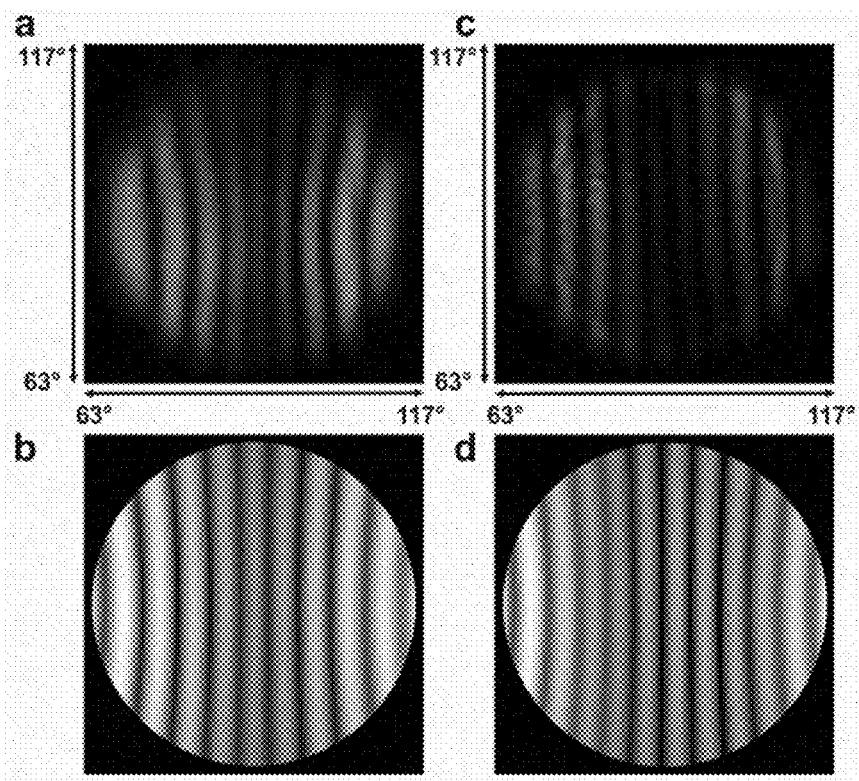
FIG. 9 is the experimental pattern and the simulation pattern of microspheres provided in the present invention embodiment 3.

In order to test the working effect and stability of the label free high content video flow cytometry on the micron scale in Embodiment 1, two standard polystyrene microspheres are used for experimental verification and calibration in this embodiment. The sizes of the two microspheres are 3.87 µm and 4.19 µm. The number of 3.87 µm spheres in about 20 s was calculated, compared with the Mie simulation results. The results are shown in FIG. 8 and FIG. 9.

Specific Operation Steps:
(1) 2 µL standard microsphere stock solution is dissolve in 4 mL ultrapure water, and place it in the sample syringe. Ultrapure water is extract as sheath liquid and place it in the sheath syringe.
(2) Set the parameters of the syringe pump and start the syringe pump. The flow rate of the sample and sheath is 30 uL/h and 800 uL/h, respectively.
(3) Open the light source and high speed CMOS, collect high quality video data. Observe the formation of sheath flow and imaging effect, adjust the stage to make the system work in defocusing mode.
(4) Open the trigger, collect the 2D light scattering high quality video data.
(5) After collection, the sample liquid and sheath liquid are replaced as 75% alcohol solution and ultrapure water to flush the system.

(6) The analysis algorithm is used to count the number of spheres, and the Mie algorithm is used to simulate the microsphere pattern under the experimental conditions.

In this embodiment, about 352 microspheres were collected from 3.87 μm microspheres data for 20 seconds. This example proves the device has better sheath flow effect and stability. The comparison between the results of Mie simulation and the experimental results shows that the device has a high micron resolution.

Embodiment 4

Figure 10:
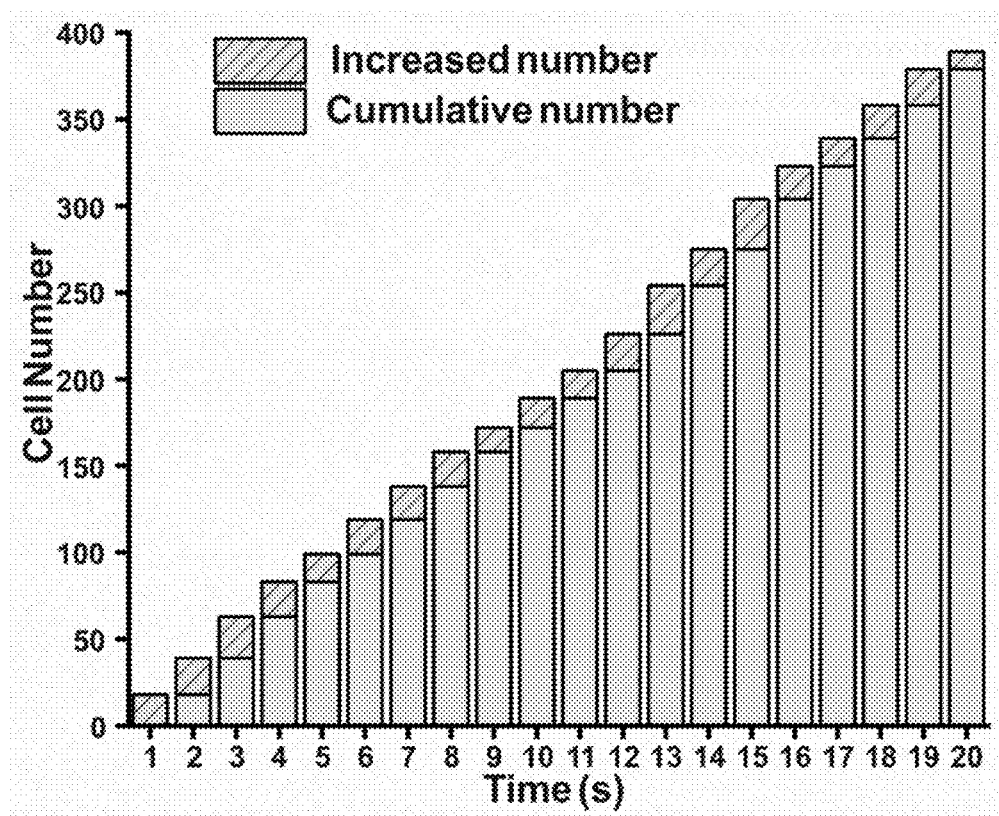
FIG. 10 is the result of the statistics of the number of cells provided in the present invention embodiment 4.
Figure 11:
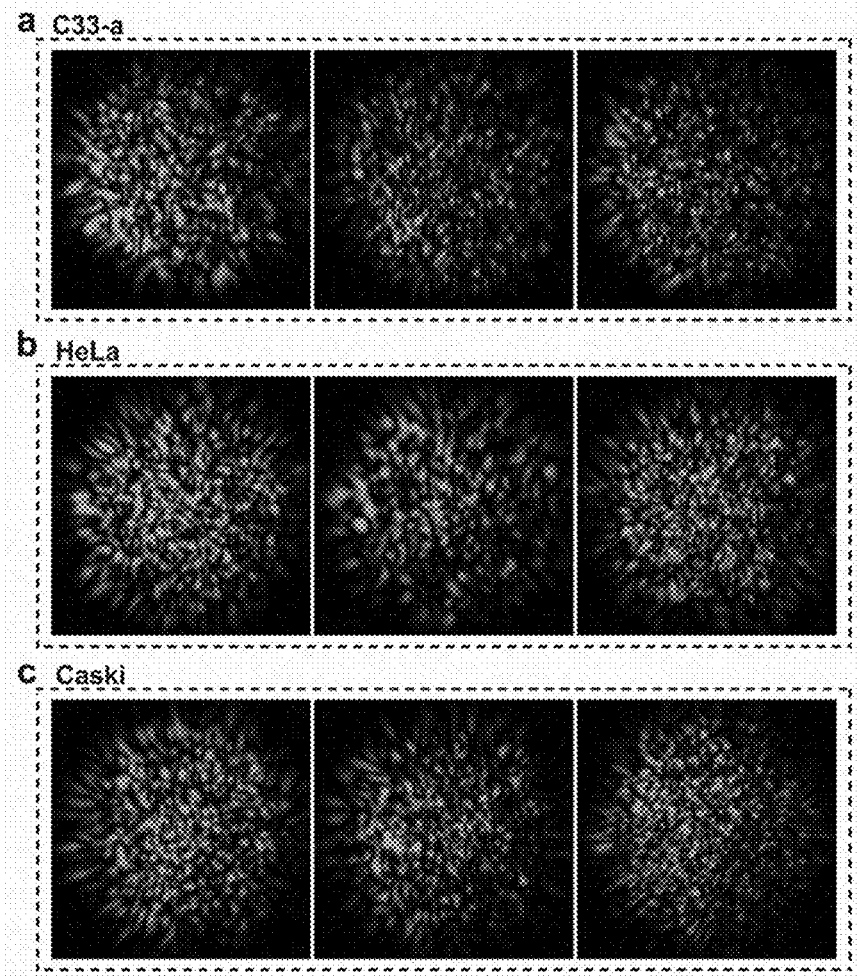
FIG. 11 is the experimental result of three cervical cancer cell-lines provided in the present invention embodiment 4.

In this embodiment, three cervical cancer cell lines (Caski, HeLa and C33-A) are detected and analyzed by 2D light scattering based high-quality video flow cytometry. The algorithm is automatically processed the video data. 5,000 patterns from each cell lines were selected for model training. 600 patterns were selected for verification. Finally, the automatic classification of three kinds of cells is realized. Specific Operation Steps:
(1) Three cultures cells were separately treated to form a single cell suspension, which is prepared with a concentration of about 500,000 per ml, and place it in a sample syringe. PBS is extracted as sheath liquid and place it in the sheath syringe.
(2) Set the parameters of the syringe pump and start the syringe pump. The flow rate of the sample and sheath is 30 uL/h and 800 uL/h, respectively.
(3) Open the light source and high speed CMOS, collect high quality video data. Observe the formation of sheath flow and imaging effect, adjust the stage to make the system work in defocusing mode.
(4) Open the trigger, collect the 2D light scattering high quality video data.
(5) After collection, the sample liquid and sheath liquid are replaced as 75% alcohol solution and ultrapure water to flush the system.
(6) Cell patterns are extracted and analyzed using automatic classification algorithm. The results are shown in FIGS. 10 and 11.

In this embodiment, CNN-SVM automatic classification algorithm is used. The transfer learning based CNN algorithm is used as feature extractor and the SVM algorithm is used as classifier. The classification results are shown in Table 1.

TABLE 1

Cell classification results of three cervical cancer cell lines

| cell type | totality | correct number | accuracy | total accuracy |
|---|---|---|---|---|
| Caski | 600 | 549 | 0.915 | |
| HeLa | 600 | 543 | 0.905 | 0.908 |
| C33-A | 600 | 543 | 0.905 | |

Specifically, digital cell filtering was performed prior to cell sorting. The digital cell filtering preprocessing part mainly uses morphological granularity analysis method and machine learning algorithm to filter the 2D light scattering video data frame by frame. The morphological granularity analysis method mainly quickly removes simple contaminations such as cell fragments and air bubbles in the video. The machine learning algorithm mainly removes more complex contaminations. The morphological granularity analysis method can extract the intensity and gradient information of speckle, and the threshold is limited to the range of 60% of the features of each dimension (centered on the mean). The machine learning filter model is trained by a prior pattern and impurity dataset, and the training network model is CNN.

CNN-SVM classification part include CNN feature extractor and SVM classifier. CNN feature extractor is constitute of a neural network, which input 2D light scattering pattern training data and output the training data feature vector. SVM classifier automatically optimizes the classification function by finding the optimal parameters and realizes the automatic classification of samples based on the input feature vector. The CNN network used in the present invention is the Inception v3 network. The front of the network consists of an alternating structure of 5 convolutional layers and 2 pooling layers, which are then formed by combining three sub-network circuits, and finally the average pooling layer integrates the output results.

Embodiment 5

Embodiment 5 provides a computer readable storage medium, on which a program is stored, and when the program is executed by a processor, the following steps are implemented:
(1) The 2D light scattering video data is preprocessed to obtain the image data without impurities.
(2) The filtered image data is archived and labeled according to the ground truth.
(3) Based on the first convolutional neural network with pre-trained parameters and the obtained image data and labels, the feature vector of the image data is obtained.
(4) The obtained feature vector is input into the preset support vector machine model to obtain the cell classification screening result.

Among, the support vector machine model is trained by feature vectors of clinical samples and transferred feature vectors of cell-lines.

The detailed method is the same as that provided in Embodiment 1 and will not be described here.

Embodiment 6

Embodiment 6 provides an electronic device, including a memory, a processor, and a program stored in the memory and running on the processor, where the processor implements the following steps when executing the program:
(1) The 2D light scattering video data is preprocessed to obtain the image data without impurities.
(2) The filtered image data is archived and labeled according to the ground truth.
(3) Based on the first convolutional neural network with pre-trained parameters and the obtained image data and labels, the feature vector of the image data is obtained.
(4) The obtained feature vector is input into the preset support vector machine model to obtain the cell classification screening result.

Among, the support vector machine model is trained by feature vectors of clinical samples and transferred feature vectors of cell-lines.

The detailed method is the same as that provided in Embodiment 1 and will not be described here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "circuit" or "system." Furthermore, aspects of the present invention may take the form of a computer program product embodied in one or more computer readable medium(s) having computer readable program code embodied thereon.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Those of ordinary skill in the art can understand that all or part of the processes in the methods of the above embodiments can be implemented by instructing relevant hardware through a computer program, and the program can be stored in a computer-readable storage medium. During execution, the processes of the embodiments of the above-mentioned methods may be included. The storage medium may be a magnetic disk, an optical disk, a read-only memory (ROM), or a random access memory (RAM) or the like.

The above descriptions are only preferred embodiments of the present invention, and are not intended to limit the present invention. For those skilled in the art, the present invention may have various modifications and changes. Any modification, equivalent replacement, improvement, etc. made within the spirit and principle of the present invention shall be included within the protection scope of the present invention.

What is claimed is:

1. A label-free cell classification and screening system based on hybrid transfer learning, comprising:
   i) a data preprocessing circuit, which is configured to: acquire 2D light scattering video data, preprocess the 2D light scattering video data to obtain images after removing disturbance;
   ii) an image archiving circuit, which is configured to: sort and label the images to get labeled images according to a ground truth;
   iii) a feature extraction circuit, which is configured to: get feature vector of the labeled images using a first convolutional neural network with pre-trained parameters; and
   iv) a cell classification and screening circuit, which is configured to: input the feature vector into a trained support vector machine model to get cell classification results;
   wherein,
      the support vector machine model is trained with feature vectors of clinical samples and transferred feature vectors of cell-lines;
      preprocessing the 2D light scattering video data, including a digital cell filtering technique, including:
   videos of the 2D light scattering video data are divided into the images data frame by frame, and then the images are filtered;
      each image of the images is processed by morphological granularity analysis algorithm to obtain an image morphological granularity characteristic value;
      determine whether a feature value meets a pre-set standard, if so, keep the image, otherwise remove the image; and
      a trained machine learning model is used to further filter the images.

2. The label-free cell classification and screening system based on hybrid transfer learning according to claim 1, wherein
   the data preprocessing circuit comprises a label-free high-content video flow cytometry; wherein the label-free high-content video flow cytometry comprises an optical excitation circuit, a sheath flow control circuit, and data acquisition and processing circuit;
   the optical excitation circuit excites samples flowing in the flow chamber of the sheath flow control circuit to generate the scattering information; these patterns are measured by the data acquisition circuit and transmitted to the data processing circuit for following processing and analysis;
   wherein the sheath flow control circuit restricts the spatial flowing area of samples for forming a flowing single-cell sequence; and a laser beam of the optical excitation circuit is shaped by an objective and coupled into a flow chamber, the flowing single-cell sequence and the laser beam only overlap in a preset area.

3. The label-free cell classification and screening system based on hybrid transfer learning according to claim 2, wherein
   the optical excitation circuit comprises a laser source, neutral density lens (light intensity control), collimating diaphragms, mirrors (direction control) and an excitation objective (shaping laser beam), which are set along an optical path in sequence;
   the sheath flow control circuit is used for driving cells to form the single-cell sequence, including a flow chamber, a syringe pump for sample fluid and a syringe pump for sheath fluid; the sample fluid flows into flow chamber from the middle inlet, while the sheath fluid flows from the surrounding inlet; the velocity of the sheath fluid is greater than the sample fluid;
   the sheath fluid passes through a buffer chamber to stabilize the fluid and pre-disperse flowing direction to ensure that the sheath fluid compresses the sample fluid in two orthogonal directions at the same time before the sheath fluid flows through the preset area;

the sheath flow control circuit further includes a waste liquid pool for collecting the sample fluid and the sheath fluid after flowing through the preset area;

the data acquisition circuit comprises a measurement optical path and a data path; the measurement optical path includes a detection objective, a high-speed CMOS detector and a trigger at least; the detection objective focuses on the overlapping portion of the sample sequence and the excitation beam; and the trigger is positioned ahead of the detector to control the storage time of the detector; and the data path transmits and stores the high-quality video data acquired by the high-speed CMOS detector to the data processing circuit.

4. The label-free cell classification and screening system based on hybrid transfer learning according to claim 2, wherein a high-speed and high-resolution image sensor is integrated into the system to ensure spatial and temporal resolution of high-content video data measurement; about 13.5 G/min 2D light scattering video of clinical sample cells is obtained.

5. The label-free cell classification and screening system based on hybrid transfer learning according to claim 1, wherein a second convolutional neural network is trained by using natural images, and the pre-trained parameters of the second convolutional neural network are transferred to the first convolutional neural network;

the second convolutional neural network is trained by using natural images, and the pre-trained parameters of the second convolutional neural network are transferred to a third convolutional neural network; cell line data is used as a third convolutional neural network input data to obtain the feature vectors of the cell line data; the cell line feature vectors are proportionally transferred to the clinical sample feature vector dataset, and the SVM model is trained using the transferred feature vector dataset.

6. The label-free cell classification and screening system based on hybrid transfer learning according to claim 1, wherein classification probability value of groups of cells is obtained according to the well trained support vector machine model, and the state of the sample is determined according to the classification probability value and the preset threshold.

7. The label-free cell classification and screening system based on hybrid transfer learning according to claim 1, wherein the Inception v3 model is used in this invention, and the output before the full connection layer is selected as the extracted features.

8. The label-free cell classification and screening system based on hybrid transfer learning according to claim 1, wherein the classification accuracy of normal samples and cancer samples change with the proportion of transferred features of cell line samples; the position where the two curves intersect is set as the mixing ratio.

* * * * *